(12) United States Patent
Hokari et al.

(10) Patent No.: US 12,680,275 B2
(45) Date of Patent: Jul. 14, 2026

(54) ACTIVATION SYSTEM OF WORK MACHINE AND ACTIVATION METHOD OF WORK MACHINE

(71) Applicant: Komatsu Ltd., Tokyo (JP)

(72) Inventors: Tomofumi Hokari, Tokyo (JP); Yuichiro Yasuda, Tokyo (JP); Kenji Nozaki, Tokyo (JP); Kosuke Iwata, Tokyo (JP)

(73) Assignee: KOMATSU LTD., Tokyo (JP)

( * ) Notice: Subject to any disclaimer, the term of this patent is extended or adjusted under 35 U.S.C. 154(b) by 209 days.

(21) Appl. No.: 18/277,619

(22) PCT Filed: Mar. 15, 2022

(86) PCT No.: PCT/JP2022/011720
§ 371 (c)(1),
(2) Date: Aug. 17, 2023

(87) PCT Pub. No.: WO2022/209873
PCT Pub. Date: Oct. 6, 2022

(65) Prior Publication Data

US 2024/0133160 A1     Apr. 25, 2024
US 2024/0229424 A9     Jul. 11, 2024

(30) Foreign Application Priority Data

Mar. 31, 2021     (JP) ................................. 2021-061237

(51) Int. Cl.
*E02F 9/24*     (2006.01)
*B60R 25/24*     (2013.01)
*B60R 25/25*     (2013.01)

(52) U.S. Cl.
CPC ................ *E02F 9/24* (2013.01); *B60R 25/24* (2013.01); *B60R 25/25* (2013.01)

(58) Field of Classification Search
CPC . E02F 9/24; B60R 25/24; B60R 25/25; B60R 25/241; G07C 2009/00507; G07C 2209/63

(Continued)

(56) References Cited

U.S. PATENT DOCUMENTS 6,930,591 B2 * 8/2005 Asakage ................. B60R 25/24
                                              235/382
7,046,126 B2 * 5/2006 Flick ....................... B60R 25/24
                                              340/426.36

(Continued)

FOREIGN PATENT DOCUMENTS

CN          101218132 A     7/2008
JP        2002-331912 A    11/2002

(Continued)

*Primary Examiner* — Krishnan Ramesh

(74) *Attorney, Agent, or Firm* — Troutman Pepper Locke LLP; James E. Amstrong, IV; Joshua L. Jones

(57)          ABSTRACT

An activation system of a work machine includes a vehicle body control unit outputting a control signal to drive a vehicle body of the work machine with power supplied by a power source, and an authentication unit performing authentication of an operator of the work machine. The activation system of a work machine first activates the authentication unit, and activates the vehicle body control unit when the authentication unit authenticates that the operator boarding the work machine is a specific operator.

7 Claims, 9 Drawing Sheets

(58) Field of Classification Search
USPC ............................................................. 701/50
See application file for complete search history.

(56)                     References Cited

U.S. PATENT DOCUMENTS

| | | | |
|---|---|---|---|
| 2007/0073469 A1 | 3/2007 | Watanabe | |
| 2009/0128356 A1 | 5/2009 | Nitta et al. | |
| 2014/0282931 A1* | 9/2014 | Protopapas | B60R 25/2081 |
| | | | 726/5 |
| 2015/0301518 A1* | 10/2015 | Takemoto | G05B 19/408 |
| | | | 701/29.1 |
| 2017/0282857 A1* | 10/2017 | Nakamura | E02F 9/265 |
| 2017/0284426 A1* | 10/2017 | Nomura | F02D 29/04 |
| 2018/0106016 A1* | 4/2018 | Uji | G05B 19/042 |
| 2018/0286156 A1 | 10/2018 | Tamai et al. | |
| 2020/0223312 A1* | 7/2020 | Heitsman | G06V 40/172 |
| 2020/0399857 A1* | 12/2020 | Yamamoto | E02F 9/26 |
| 2021/0032847 A1* | 2/2021 | Carlson | E02F 3/3417 |
| 2021/0173354 A1* | 6/2021 | Shiraki | A61B 5/1032 |
| 2021/0192034 A1* | 6/2021 | Kanayama | G06F 21/35 |
| 2021/0229631 A1* | 7/2021 | Golgiri | B60R 25/241 |
| 2022/0153311 A1* | 5/2022 | Yang | B60W 60/00253 |
| 2022/0237277 A1* | 7/2022 | Rahman | B60W 40/08 |
| 2022/0274552 A1* | 9/2022 | Nakagawa | H04M 1/72412 |
| 2023/0082533 A1* | 3/2023 | Kim | E02F 9/20 |
| | | | 701/1 |
| 2023/0094085 A1* | 3/2023 | Kim | G06Q 30/0645 |
| | | | 340/5.7 |

FOREIGN PATENT DOCUMENTS

| | | | |
|---|---|---|---|
| JP | 2007-084012 A | 4/2007 | |
| JP | 2014-205469 A | 10/2014 | |
| JP | 2017-024718 A | 2/2017 | |
| JP | 2018-173923 A | 11/2018 | |
| JP | 2019-167725 A | 10/2019 | |
| KR | 10-2014-0088949 A | 7/2014 | |
| KR | 10-2015-0075699 A | 7/2015 | |
| KR | 10-2018-0001298 A | 1/2018 | |
| KR | 10-2018-0001314 A | 1/2018 | |

* cited by examiner

FIG. 3

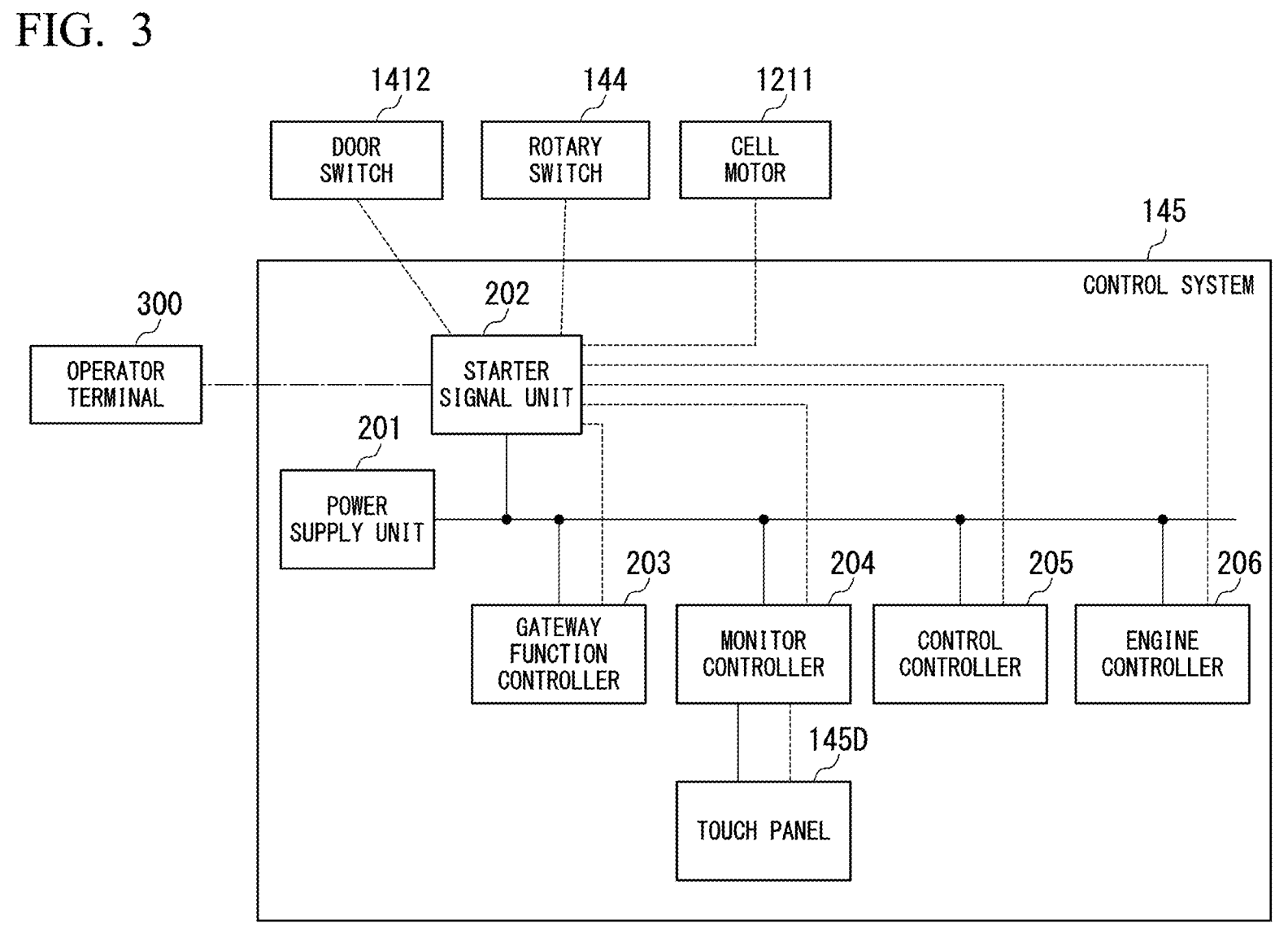

300 — OPERATOR TERMINAL

CONTROL SYSTEM — 145

1412 — DOOR SWITCH

144 — ROTARY SWITCH

1211 — CELL MOTOR

202 — STARTER SIGNAL UNIT

201 — POWER SUPPLY UNIT

203 — GATEWAY FUNCTION CONTROLLER

204 — MONITOR CONTROLLER

145D — TOUCH PANEL

205 — CONTROL CONTROLLER

206 — ENGINE CONTROLLER

ACTIVATION SYSTEM OF WORK MACHINE AND ACTIVATION METHOD OF WORK MACHINE

TECHNICAL FIELD

The present disclosure relates to an activation system of a work machine and an activation method of a work machine.

Priority is claimed on Japanese Patent Application No. 2021-061237, filed Mar. 31, 2021, the content of which is incorporated herein by reference.

BACKGROUND ART

In the field of work machines, a technique is known that uses a keyless entry system to determine the presence of an operator by a wireless signal, so as to enable a door to be unlocked. For example, Patent Document 1 discloses a technique for a keyless entry system.

CITATION LIST

Patent Document

Patent Document 1

Japanese Unexamined Patent Application, First Publication No. 2014-205469

SUMMARY OF INVENTION

Technical Problem

From a viewpoint of security, it is desired that a vehicle body control unit not be activated until an operator is authenticated.

An object of the present disclosure is to provide an activation system of a work machine and an activation method of a work machine, which can perform authentication of an operator without activating a control unit that outputs a control signal to drive a vehicle body of the work machine with power supplied by a power source.

Solution to Problem

According to an aspect of the present disclosure, an activation system of a work machine includes a vehicle body control unit configured to output a control signal to drive a vehicle body of the work machine with power supplied by a power source, an authentication unit configured to perform authentication of an operator of the work machine, and an activation unit configured to activate the authentication unit, and to activate the vehicle body control unit when the authentication unit authenticates that the operator is a specific operator.

Advantageous Effects of Invention

According to the above aspect, the activation system of the work machine can perform the authentication of the operator without activating the control unit that outputs a control signal to drive the vehicle body of the work machine with power supplied by the power source.

BRIEF DESCRIPTION OF DRAWINGS

FIG. 3 is a schematic block diagram showing a hardware configuration of a control system according to the first embodiment.

DESCRIPTION OF EMBODIMENTS

First Embodiment

Hereinafter, an embodiment is described in detail with reference to the drawings.

<<Configuration of Work Machine 100>>

Figure 1:
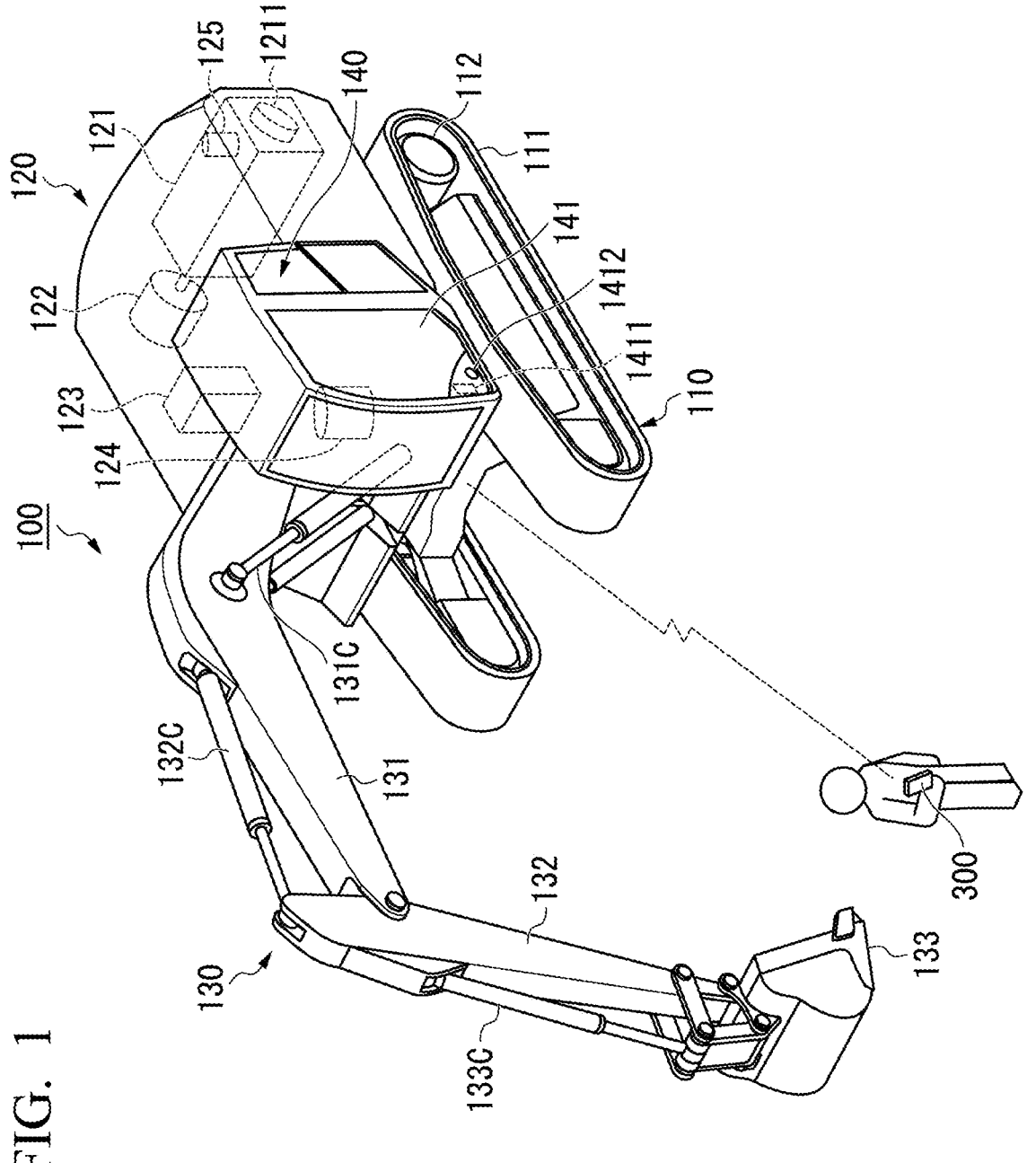
FIG. 1 is a schematic diagram showing a configuration of a work machine according to a first embodiment.

FIG. 1 is a schematic diagram showing a configuration of a work machine 100 according to a first embodiment.

The work machine 100 operates at a construction site and constructs a construction target such as earth. The work machine 100 according to the first embodiment is, for example, a hydraulic excavator. The work machine 100 includes an undercarriage 110, a swing body 120, work equipment 130, and a cab 140. The work machine 100 according to the first embodiment performs authentication of an operator by performing communication with an operator terminal 300 such as a smartphone owned by the operator by Bluetooth low energy (BLE) (Bluetooth is a registered trademark). Incidentally, in another embodiment, the work machine 100 and the operator terminal 300 may perform communication by a short-range wireless communication method other than BLE, such as Bluetooth (registered trademark) and Zigbee (registered trademark).

The undercarriage 110 travellably supports the work machine 100. The undercarriage 110 includes two endless tracks 111 provided on the left and right and two traveling motors 112 for driving the endless tracks 111.

The swing body 120 is supported by the undercarriage 110 to be swingable around a swing center.

The work equipment 130 is driven by hydraulic pressure. The work equipment 130 is supported by a front portion of the swing body 120 to be driveable in an up-down direction. The cab 140 has a space in which an operator boards and operates the work machine 100. The cab 140 is provided on a left front portion of the swing body 120.

Here, a portion of the swing body 120 to which the work equipment 130 is attached is referred to as a front portion. In addition, in the swing body 120, a portion on an opposite side, a portion on a left side, and a portion on a right side with respect to the front portion are referred to as a rear portion, a left portion, and a right portion.

<<Configuration of Swing Body 120>>

The swing body 120 includes an engine 121, a hydraulic pump 122, a control valve 123, a swing motor 124, and a fuel injection device 125.

The engine 121 is a prime mover that drives the hydraulic pump 122. The engine 121 is an example of a power source. A cell motor 1211 is provided in the engine 121. The engine 121 is activated by the rotation of the cell motor 1211.

The hydraulic pump 122 is a variable capacity pump driven by the engine 121. The hydraulic pump 122 supplies hydraulic oil to each actuator (a boom cylinder 131C, an arm cylinder 132C, a bucket cylinder 133C, the traveling motor 112, and the swing motor 124) via the control valve 123.

The control valve 123 controls the flow rate of the hydraulic oil supplied from the hydraulic pump 122.

The swing motor 124 is driven by the hydraulic oil supplied from the hydraulic pump 122 via the control valve 123 to swing the swing body 120.

The fuel injection device 125 injects fuel into the engine 121.

<<Configuration of Work Equipment 130>>

The work equipment 130 includes a boom 131, an arm 132, a bucket 133, the boom cylinder 131C, the arm cylinder 132C, and the bucket cylinder 133C.

A base end portion of the boom 131 is attached to the swing body 120 via a boom pin.

The arm 132 connects the boom 131 and the bucket 133. A base end portion of the arm 132 is attached to a tip portion of the boom 131 via an arm pin.

The bucket 133 includes an edge for excavating earth and the like, and an accommodating portion that accommodates the excavated earth. A base end portion of the bucket 133 is attached to a tip portion of the arm 132 via a bucket pin.

The boom cylinder 131C is a hydraulic cylinder to operate the boom 131. A base end portion of the boom cylinder 131C is attached to the swing body 120. A tip portion of the boom cylinder 131C is attached to the boom 131.

The arm cylinder 132C is a hydraulic cylinder to drive the arm 132. A base end portion of the arm cylinder 132C is attached to the boom 131. A tip portion of the arm cylinder 132C is attached to the arm 132.

The bucket cylinder 133C is a hydraulic cylinder to drive the bucket 133. A base end portion of the bucket cylinder 133C is attached to the arm 132. A tip portion of the bucket cylinder 133C is attached to a link member connected to the bucket 133.

<<Configuration of Cab 140>>

On the left surface of the cab 140, a door 141 is provided for an operator to board. The door 141 is provided with a lock actuator 1411 to lock the door 141 and a door switch 1412 to release the lock.

Figure 2:
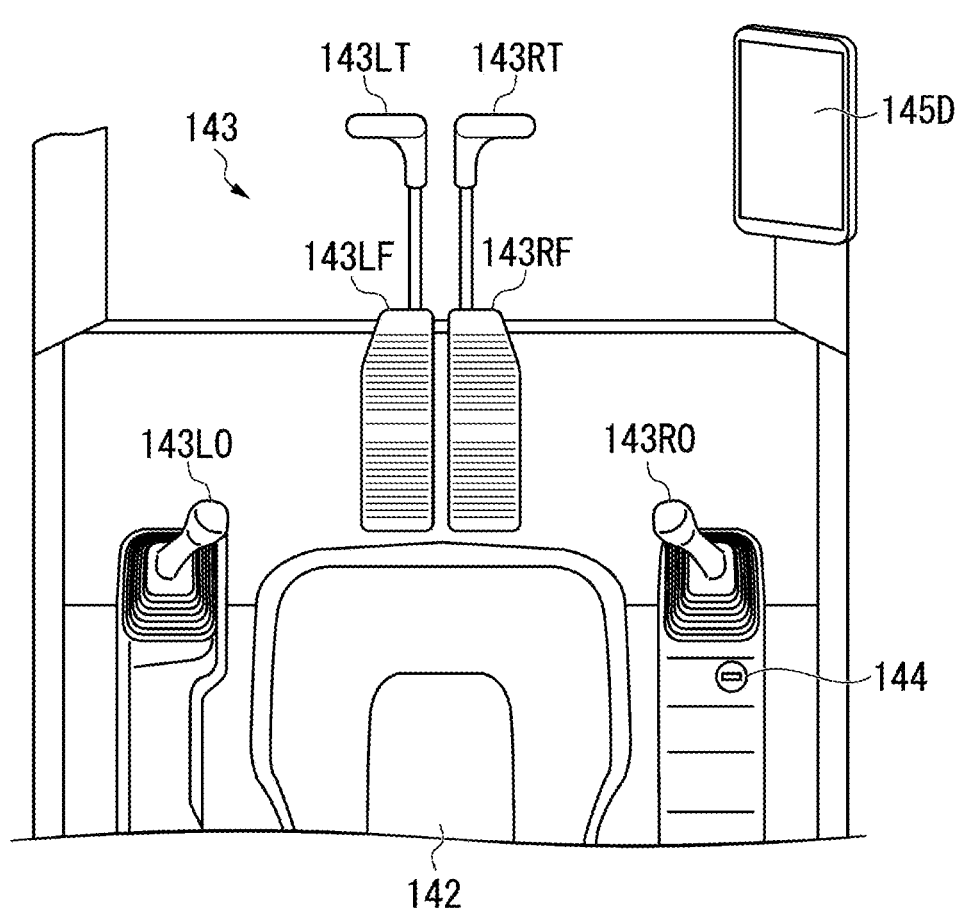
FIG. 2 is a view showing an internal configuration of a cab according to the first embodiment.

FIG. 2 is a diagram showing an internal configuration of the cab 140 according to the first embodiment.

In the cab 140, a driver seat 142, an operation device 143, a rotary switch 144, and a touch panel 145D are provided. The rotary switch 144 is a switch that takes four positions of OFF, ACC (accessory), IG (ignition), and ST (start) when rotated. Incidentally, when the finger is released from the rotary switch 144 at the ST position, the rotary switch 144 automatically returns to the IG position by a spring mechanism (not shown).

The operation device 143 is a device to drive the undercarriage 110, the swing body 120, and the work equipment 130 by a manual operation of the operator. The operation device 143 includes a left operation lever 143LO, a right operation lever 143RO, a left foot pedal 143LF, a right foot pedal 143RF, a left traveling lever 143LT, and a right traveling lever 143RT.

The left operation lever 143LO is provided on a left side of the driver seat 142. The right operation lever 143RO is provided on a right side of the driver seat 142.

The left operation lever 143LO is an operation mechanism to cause the swing body 120 to perform a swing operation and to cause the arm 132 to perform an excavating or dumping operation. Specifically, when the operator of the work machine 100 tilts the left operation lever 143LO forward, the arm 132 performs a dumping operation. In addition, when the operator of the work machine 100 tilts the left operation lever 143LO backward, the arm 132 performs an excavating operation. In addition, when the operator of the work machine 100 tilts the left operation lever 143LO in a right direction, the swing body 120 swings rightward. In addition, when the operator of the work machine 100 tilts the left operation lever 143LO in a left direction, the swing body 120 swings leftward. Incidentally, in another embodiment, when the left operation lever 143LO is tilted in a front-back direction, the swing body 120 may swing rightward or swing leftward, and when the left operation lever 143LO is tilted in a right-left direction, the arm 132 may perform an excavating operation or a dumping operation.

The right operation lever 143RO is an operation mechanism to cause the bucket 133 to perform an excavating or dumping operation and to cause the boom 131 to perform a rising or lowering operation. Specifically, when the operator of the work machine 100 tilts the right operation lever 143RO forward, a lowering operation of the boom 131 is executed. In addition, when the operator of the work machine 100 tilts the right operation lever 143RO backward, a rising operation of the boom 131 is executed. In addition, when the operator of the work machine 100 tilts the right operation lever 143RO in the right direction, a dumping operation of the bucket 133 is performed. In addition, when the operator of the work machine 100 tilts the right operation lever 143RO in the left direction, an excavating operation of the bucket 133 is performed. Incidentally, in another embodiment, when the right operation lever 143RO is tilted in the front-back direction, the bucket 133 may perform a dumping operation or an excavating operation, and when the right operation lever 143RO is tilted in the right-left direction, the boom 131 may perform a rising operation or a lowering operation.

The left foot pedal 143LF is disposed on a left portion of a floor surface in front of the driver seat 142. The right foot pedal 143RF is disposed on a right portion of the floor surface in front of the driver seat 142. The left traveling lever 143LT is pivotally supported by the left foot pedal 143LF, and is configured such that the inclination of the left traveling lever 143LT and the pressing down of the left foot pedal 143LF are linked to each other. The right traveling lever 143RT is pivotally supported by the right foot pedal 143RF, and is configured such that the inclination of the right traveling lever 143RT and the pressing down of the right foot pedal 143RF are linked to each other.

The left foot pedal 143LF and the left traveling lever 143LT correspond to rotational drive of a left crawler belt of the undercarriage 110. Specifically, when the operator of the work machine 100 tilts the left foot pedal 143LF or the left traveling lever 143LT forward, the left crawler belt rotates in a forward movement direction. In addition, when the operator of the work machine 100 tilts the left foot pedal 143LF or the left traveling lever 143LT backward, the left crawler belt rotates in a backward movement direction.

The right foot pedal 143RF and the right traveling lever 143RT correspond to rotational drive of a right crawler belt of the undercarriage 110. Specifically, when the operator of the work machine 100 tilts the right foot pedal 143RF or the right traveling lever 143RT forward, the right crawler belt rotates in the forward movement direction.

In addition, when the operator of the work machine 100 tilts the right foot pedal 143RF or the right traveling lever 143RT backward, the right crawler belt rotates in the backward movement direction.

<Configuration of Control System 145>

FIG. 3 is a schematic block diagram showing a hardware configuration of a control system 145 according to the first embodiment. In FIG. 3, the solid line represents a power line, and the dashed line represents a signal line. In addition, in FIG. 3, a dot-dashed line represents wireless communication.

The control system 145 includes a power supply unit 201, a starter signal unit 202, a gateway function controller 203, a monitor controller 204, a control controller 205, and an engine controller 206. The starter signal unit 202, the gateway function controller 203, the monitor controller 204, the control controller 205, and the engine controller 206 are connected to each other via an in-vehicle network such as a controller area network (CAN) or an Ethernet (registered trademark).

The power supply unit 201 supplies electric energy to each device constituting the control system 145.

The starter signal unit 202 receives a signal inputted from the door switch 1412, the rotary switch 144, the operator terminal 300, and the monitor controller 204. The starter signal unit 202 outputs an activation signal to the gateway function controller 203, the monitor controller 204, the control controller 205, the engine controller 206, the lock actuator 1411, or the cell motor 1211 based on the inputted signal. The controller to which the activation signal is inputted is activated and operates by the electric energy supplied from the power supply unit 201. The starter signal unit 202 is an example of an activation unit that activates the control controller 205. Incidentally, the starter signal unit 202 always operates by receiving the electric energy supplied from the power supply unit 201 although other controllers are in a stopped state. On the other hand, when the work machine 100 is not activated, the starter signal unit 202 may be configured such that only a BLE communication unit 221 (to be described later) is put into an activation state and other configurations are in a dormant state, or may activate intermittently.

The gateway function controller 203 relays communication between controllers such as the starter signal unit 202, the monitor controller 204, the control controller 205, and the engine controller 206.

The monitor controller 204 controls the display on the touch panel 145D included in the control system 145, and notifies the occurrence of the touch operation of the touch panel 145D. Incidentally, the control system 145 according to another embodiment may include a monitor such as a liquid crystal display (LCD) that does not have a touch input function and a physical button, instead of the touch panel 145D. In this case, the monitor controller 204 controls the display on the monitor and notifies the pressing of the physical button.

The control controller 205 acquires various data related to hydraulic devices that control the operation of the work equipment 130 by sensors (not shown), and outputs a control signal to control the hydraulic devices according to the operation of the operation device 143. That is, the control controller 205 controls the drive of the boom cylinder 131C, the arm cylinder 132C, the bucket cylinder 133C, the traveling motor 112, the swing motor 124, and the like. The control controller 205 is an example of a vehicle body control unit that outputs a control signal to drive a vehicle body of the work machine 100 with the power supplied by the power source.

The engine controller 206 controls the engine 121 by acquiring various data related to the engine 121 through a sensor (not shown) and instructing the fuel injection device 125 on a fuel injection amount.

The control system 145 has a function of performing a log-in processing of an operator boarding the cab 140 by the operation of the touch panel 145D. For example, the control system 145 may include a controller that performs log-in processing, or the starter signal unit 202, the gateway function controller 203, or the monitor controller 204 may have a function of performing log-in processing. Specifically, the control system 145 displays an operator ID selection screen on the touch panel 145D via the monitor controller 204, and receives the selection of an operator ID. When the selected operator ID indicates an operator who is in close proximity to the work machine 100 and has the operation right, the control system 145 authenticates that the operator that boards the cab 140 is an operator having the operation right. The monitor controller 204 is an example of an authentication unit that authenticates the operator of the work machine 100.

Figure 4:
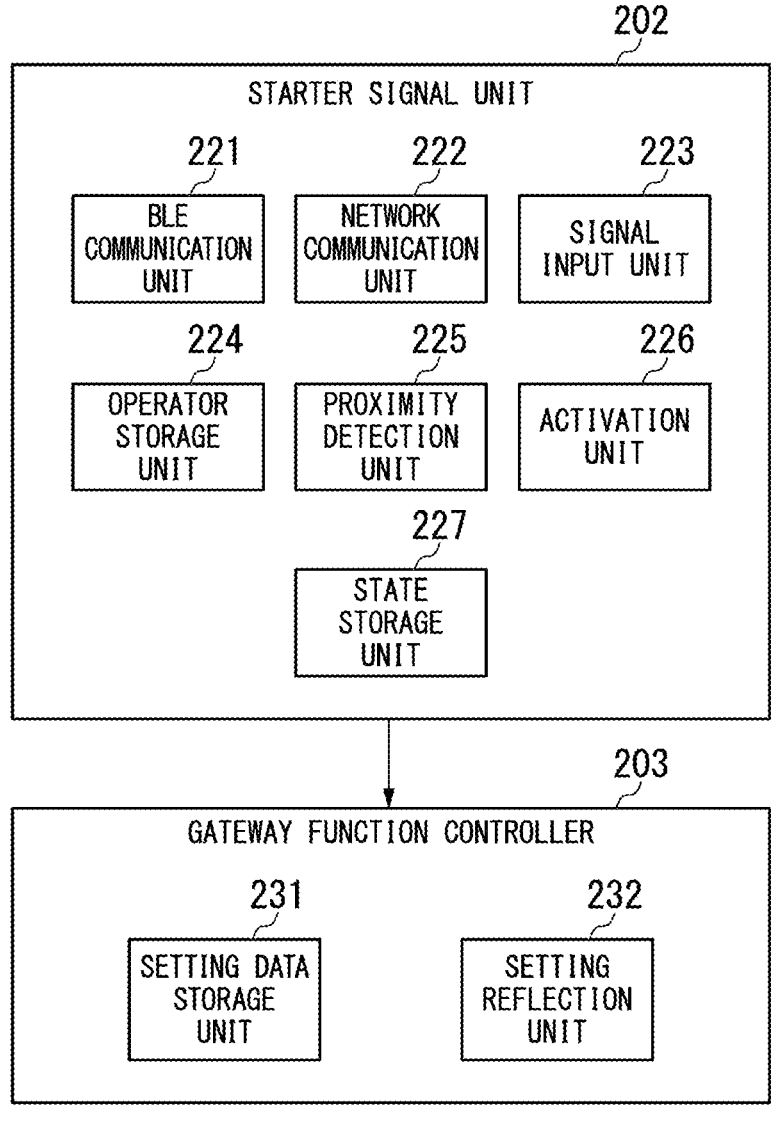
FIG. 4 is a schematic block diagram showing a software configuration of a starter signal unit and a gateway function controller according to the first embodiment.

FIG. 4 is a schematic block diagram showing a software configuration of the starter signal unit 202 and the gateway function controller 203 according to the first embodiment.

The starter signal unit 202 includes the BLE communication unit 221, a network communication unit 222, a signal input unit 223, an operator storage unit 224, a proximity detection unit 225, an activation unit 226, and a state storage unit 227.

The gateway function controller 203 includes a setting data storage unit 231 and a setting reflection unit 232. Incidentally, in the first embodiment, the gateway function controller 203 includes the setting data storage unit 231 and the setting reflection unit 232, but the setting data storage unit 231 and the setting reflection unit 232 may be provided in the starter signal unit 202 or other controllers.

The BLE communication unit 221 operates as the central of the BLE and performs communication with the operator terminal 300. The BLE communication unit 221 searches for the communicable operator terminal 300, and receives an advertising packet from the discovered operator terminal 300. The advertising packet includes an operator ID that identifies the operator and a machine ID that indicates the work machine 100 to be activated. The operator ID may be, for example, a Bluetooth (registered trademark) device address of the operator terminal 300.

The network communication unit 222 performs communication with other controllers via the in-vehicle network.

The signal input unit 223 receives signals inputted from the door switch 1412 and the rotary switch 144.

The operator storage unit 224 stores an operator ID, a display name, and a right flag indicating whether or not an operator has the operation right for the work machine 100, for each operator. A value of the right flag with ON indicates that the operator has the operation right for the work machine 100, and a value of the right flag with OFF indicates that the operator does not have the operation right for the work machine 100. Hereinafter, an operator having the value of the right flag with ON, that is, an operator who has the operation right for the work machine 100 is also referred to as a specific operator.

The proximity detection unit 225 determines whether or not the specific operator is present in the vicinity of the work machine 100, based on the advertising packet received by the BLE communication unit 221 and the information stored in the operator storage unit 224. That is, the proximity detection unit 225 detects that the specific operator is in close proximity to the work machine 100. Specifically, the proximity detection unit 225 specifies the operator ID included in the advertising packet received by the BLE communication unit 221, and determines that the specific operator is in close proximity to the work machine 100 when the right flag associated with the specified operator ID in the operator storage unit 224 is ON. The proximity detection unit 225 records the operator ID of the specific operator in close proximity, to the state storage unit 227 as the proximity state of the specific operator.

The activation unit 226 outputs an activation signal to the gateway function controller 203, the monitor controller 204, the control controller 205, the engine controller 206, the lock actuator 1411, or the cell motor 1211.

The setting data storage unit 231 stores the operator ID and setting data of the control controller 205 in association with each other for each operator. The setting data is data such as a relationship between an operation amount of the operation device 143 and a control amount of the control valve 123, and is used when the control controller 205 controls the hydraulic circuit. The setting data may be a weight value with respect to the control amount or a function indicating a relationship between the operation amount and the control amount.

The setting reflection unit 232 receives the operator ID of the logged-in operator from the starter signal unit 202, and transmits the setting data associated with the received operator ID stored in the setting data storage unit 231 to the control controller 205. As a result, the control controller 205 can reflect the setting data of the operator on board.

<<Operator Terminal 300>>

The operator terminal 300 functions as a peripheral equipment of BLE by executing an activation program of the work machine 100 installed in advance. When the activation program is executed, the operator terminal 300 displays a list of the work machines 100 and receives a selection of the work machine 100 to be activated from the operator. When the selection of the work machine 100 is received, the operator terminal 300 starts transmission of an advertising packet including the operator ID and the machine ID of the selected work machine 100.

<<Operation of Control System 145>>

Figure 5:
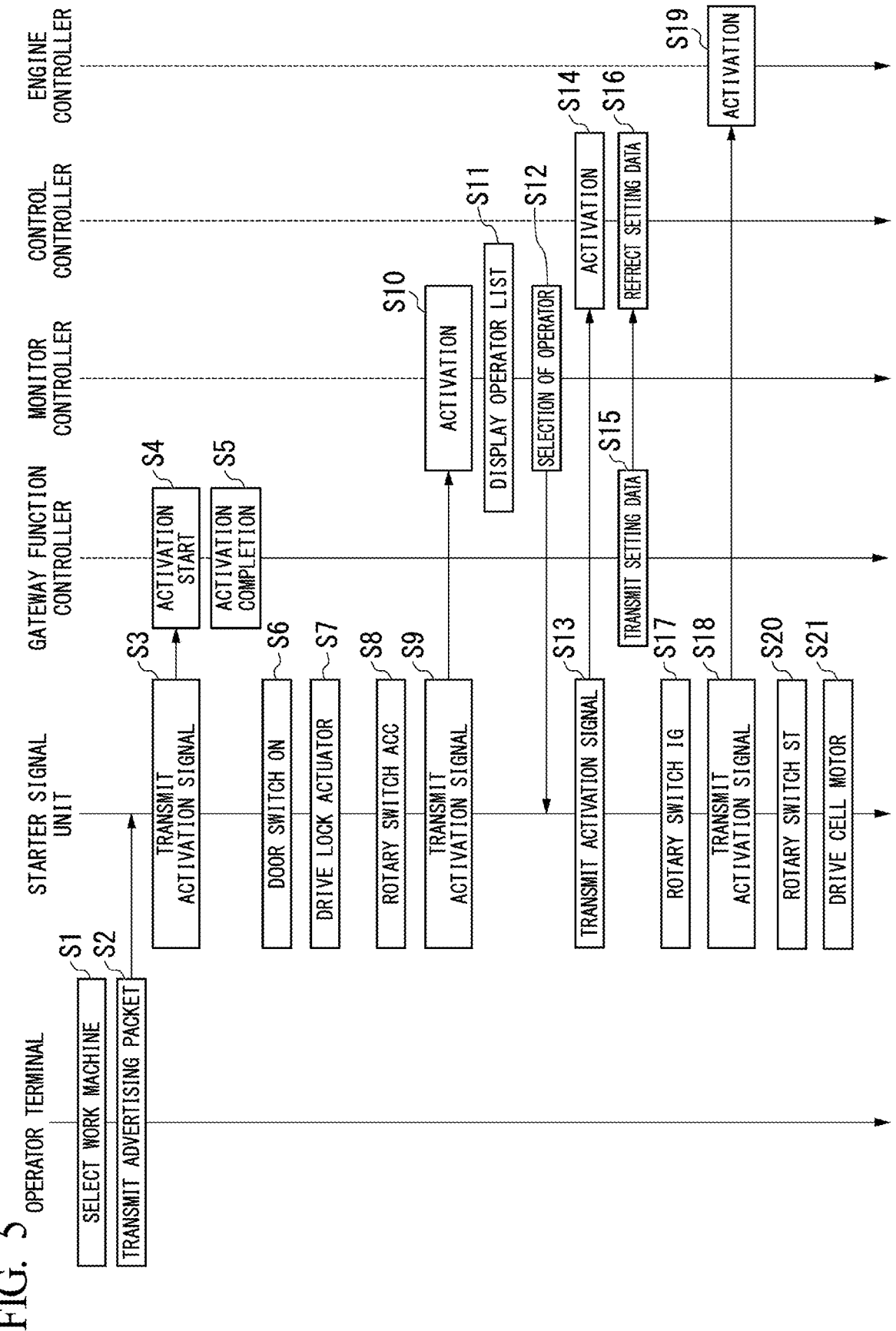
FIG. 5 is a sequence diagram showing an example of an activation operation of the work machine by the control system in the first embodiment.

Here, an activation operation of the work machine 100 when an operator (specific operator) who has the operation right for the work machine 100 boards the work machine 100 will be described. The control system 145 is an example of an activation system of the work machine 100. FIG. 5 is a sequence diagram showing an example of an activation operation of the work machine 100 by the control system 145 in the first embodiment.

When the operator operates the operator terminal 300 and executes the activation program, the operator terminal 300 displays a list of the work machines 100, and receives a selection of the work machine 100 to be activated from the operator (step S1). When the selection of the work machine 100 is received, the operator terminal 300 transmits an advertising packet including the operator ID and the machine ID of the selected work machine 100 (step S2).

When the starter signal unit 202 receives the advertising packet and determines that the specific operator is in close proximity, the starter signal unit 202 transmits an activation signal to the gateway function controller 203 (step S3). As a result, the gateway function controller 203 starts activation (step S4). Subsequently, the gateway function controller completes the activation (step S5).

When the operator reaches the work machine 100, the operator presses the door switch 1412 to open the door 141. As a result, the starter signal unit 202 receives a signal indicating ON from the door switch 1412 (step S6). The starter signal unit 202 confirms the proximity state of the specific operator, and then drives the lock actuator 1411 and releases the lock of the door 141 (step S7).

When the operator enters the cab 140 and puts the rotary switch 144 into the ACC position, the starter signal unit 202 receives a signal indicating ACC from the rotary switch 144 (step S8). The starter signal unit 202 confirms the proximity state of the specific operator, and then drives the lock actuator 1411 and releases the lock of the door 141. The starter signal unit 202 confirms the proximity state of the specific operator, and then transmits an activation signal to the monitor controller 204 (step S9). As a result, the monitor controller 204 is activated (step S10).

The monitor controller 204 outputs a signal to display a screen of a list of operators to the touch panel 145D (step S11). As a result, the monitor controller 204A displays the screen of the list of operators on the touch panel 145D. Incidentally, when the rotary switch 144 is in the ACC position, the engine 121 is not activated. That is, the starter signal unit 202 displays the screen of the list of operators while the engine 121 is stopped. The monitor controller 204 receives the selection of one operator ID from the screen of the list of operators by an operation of the operator (step S12).

The starter signal unit 202 confirms that the selected operator ID indicates the specific operator, and transmits an activation signal to the control controller 205 (step S13). As a result, the control controller 205 is activated (step S14). When the control controller 205 is activated, the setting data associated with the selected operator ID is transmitted to the control controller 205 (step S15). As a result, the control controller 205 reflects the setting data (step S16). Incidentally, the transmission timing of the setting data is not limited to the above timing. The transmission timing may be any timing as long as the setting data is reflected in the control controller 205 before the drive source is activated and various actuators can be controlled. For example, in another embodiment, the setting data may be transmitted when the rotary switch 144 enters the IG position, or the setting data may be transmitted together with the transmission of the activation signal of the engine controller 206.

When the operator puts the rotary switch 144 into the IG position, the starter signal unit 202 receives a signal indicating IG from the rotary switch 144 (step S17). The starter signal unit 202 transmits an activation signal to the engine controller 206 (step S18). As a result, the engine controller 206 is activated (step S19).

When the operator puts the rotary switch 144 into the ST position, the starter signal unit 202 receives a signal indicating ST from the rotary switch 144 (step S20). The starter signal unit 202 drives the cell motor 1211 (step S21). As a result, the engine 121 is activated, and the work machine 100 is in an operable state.

As described above, the control system 145 activates the gateway function controller 203 when the specific operator is in close proximity, and then activates the control controller 205 after the specific operator is authenticated. Since the operator needs to enter the cab 140 in order to perform authentication of the operator, the gateway function controller 203 is always activated before the control controller 205 is activated. As a result, the control system 145 can ensure the security of the work machine 100 by activating a device that does not control the vehicle body of the work machine 100, such as the gateway function controller 203, at a time when the specific operator is in close proximity. In addition, since the gateway function controller 203 takes a longer time to be activated than other devices, the waiting time for the operation of the work machine 100 can be shortened by activating the gateway function controller 203 on condition that the specific operator is in close proximity.

The operation of the starter signal unit 202 will be described below.

Figure 6:
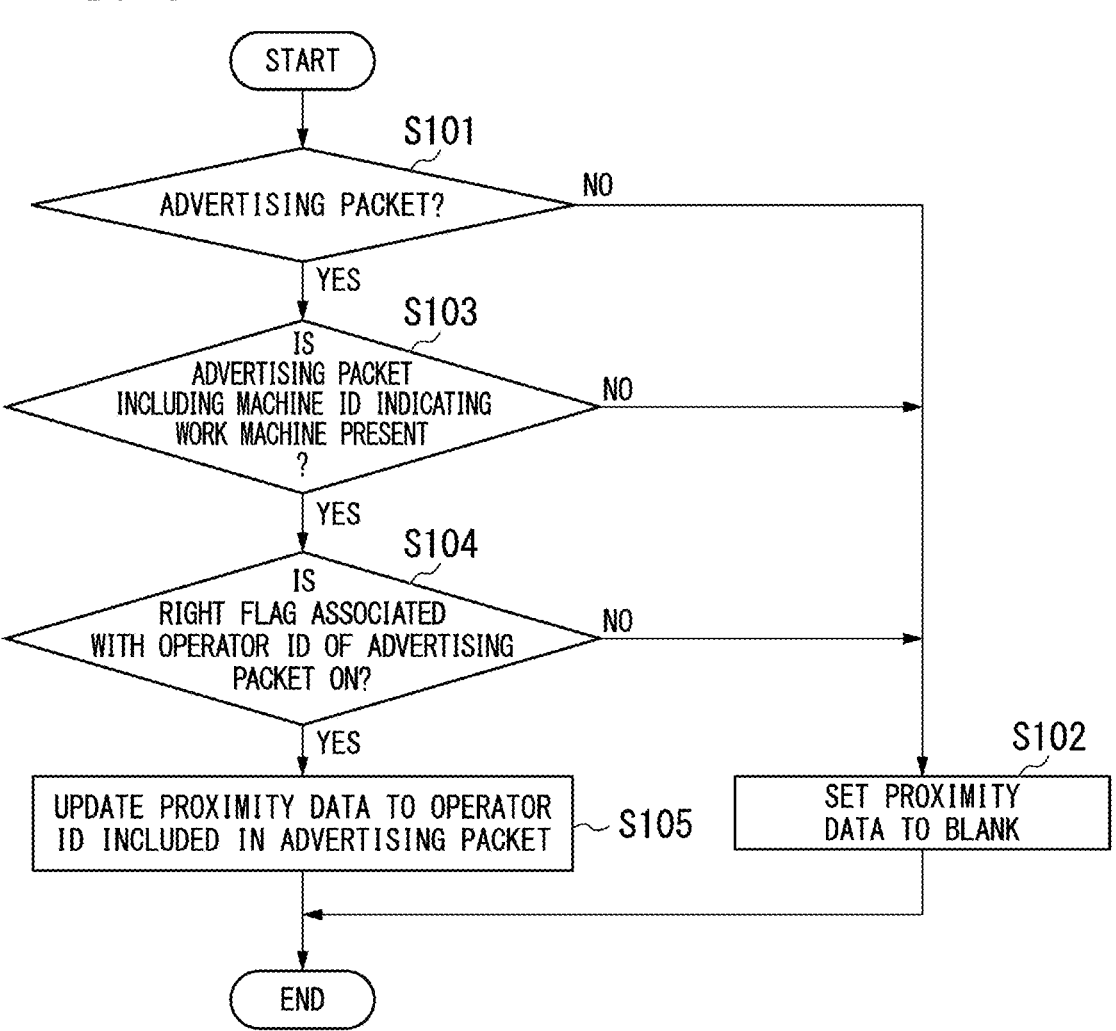
FIG. 6 is a flowchart showing communication processing with an operator terminal by the control system according to the first embodiment.

FIG. 6 is a flowchart showing communication processing with the operator terminal 300 by the control system 145 according to the first embodiment.

The BLE communication unit 221 of the starter signal unit 202 performs a BLT scan at each predetermined scan timing, and determines whether or not an advertising packet is received (step S101). When the advertising packet is not received (step S101: NO), the proximity detection unit 225 determines that the specific operator is not present in the vicinity, rewrites proximity data indicating the proximity state of the specific operator and stored in the state storage unit 227 to blank (step S102), and waits until the next scan timing.

On the other hand, when the advertising packet is received (step S101: YES), the BLE communication unit 221 reads the machine ID and the operator ID from the advertising packet (step S102). The proximity detection unit 225 determines whether or not an advertising packet including the machine ID that indicates this work machine 100 is present (step S103). When an advertising packet including the machine ID that indicates this work machine 100 is not present (step S103: NO), the proximity detection unit 225 determines that the specific operator is not present in the vicinity, rewrites the proximity data indicating the proximity state of the specific operator and stored in the state storage unit 227 to blank (step S102), and waits until the next scan timing.

When an advertising packet including the machine ID that indicates this work machine 100 is present (step S103: YES), the proximity detection unit 225 determines whether or not the right flag, which is associated with the operator ID of the advertising packet, in the operator storage unit 224 is ON (step S104). When the right flag associated with the operator ID is OFF (step S104: NO), the proximity detection unit 225 determines that the specific operator is not present in the vicinity, rewrites the proximity data indicating the proximity state of the specific operator and stored in the state storage unit 227 to blank (step S102), and waits until the next scan timing.

When the right flag associated with the operator ID is ON (step S104: YES), the proximity detection unit 225 determines that the specific operator is present in the vicinity, and updates the proximity data indicating the proximity state of the specific operator and stored in the state storage unit 227 to the operator ID included in the advertising packet (step S105).

As a result, the starter signal unit 202 can maintain the latest state of the proximity data indicating the proximity state of the specific operator.

Figure 7:
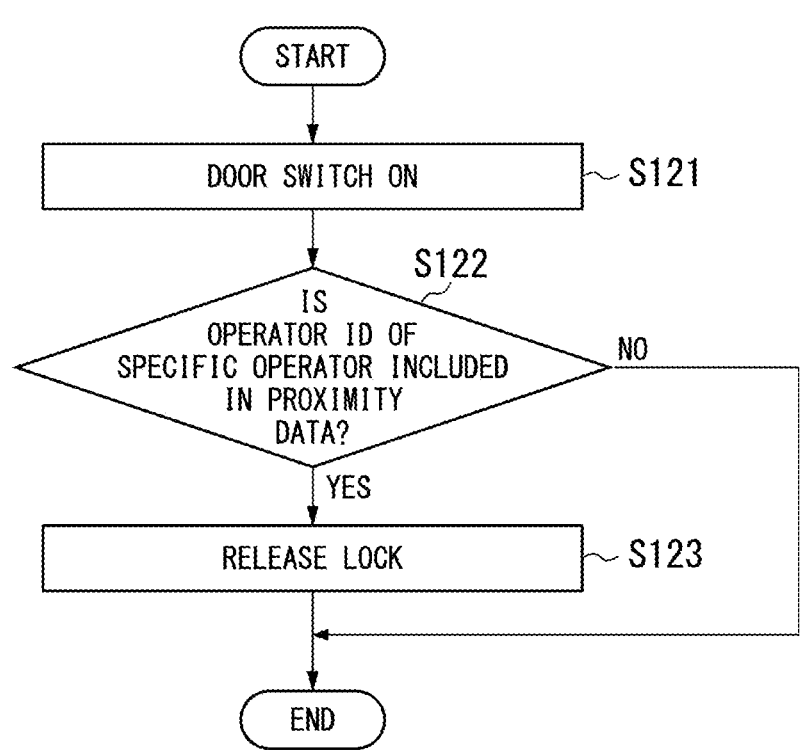
FIG. 7 is a flowchart showing an operation of the control system when a door switch is pressed in the first embodiment.

FIG. 7 is a flowchart showing an operation of the control system 145 when the door switch 1412 is pressed in the first embodiment.

When the door switch 1412 is pressed, the signal input unit 223 of the starter signal unit 202 receives the input of a signal indicating ON from the door switch 1412 (step S121). The proximity detection unit 225 refers to the proximity data in the state storage unit 227 and determines whether or not at least one of the operator ID of the specific operator is included in the proximity data (step S122). When the operator ID of the specific operator is included in the proximity data (step S122: YES), the proximity detection unit 225 determines that the specific operator is present in the vicinity, and the activation unit 226 drives the lock actuator 1411 and releases the lock of the door 141 (step S123). At this time, the activation unit 226 may sound a buzzer from a speaker (not shown) to indicate that the lock is released.

On the other hand, when the operator ID of the specific operator is not included in the proximity data (step S122: NO), the proximity detection unit 225 determines that the specific operator is not present in the vicinity, and the activation unit 226 does not drive the lock actuator 1411.

In this manner, the control system 145 releases the lock of the door 141 when the specific operator is present in the vicinity of the work machine 100 and does not release the lock when the specific operator is not present in the vicinity of the work machine 100.

Incidentally, in the work machine 100 in another embodiment, the lock may be released using a physical key instead of the flowchart of FIG. 7.

Figure 8:
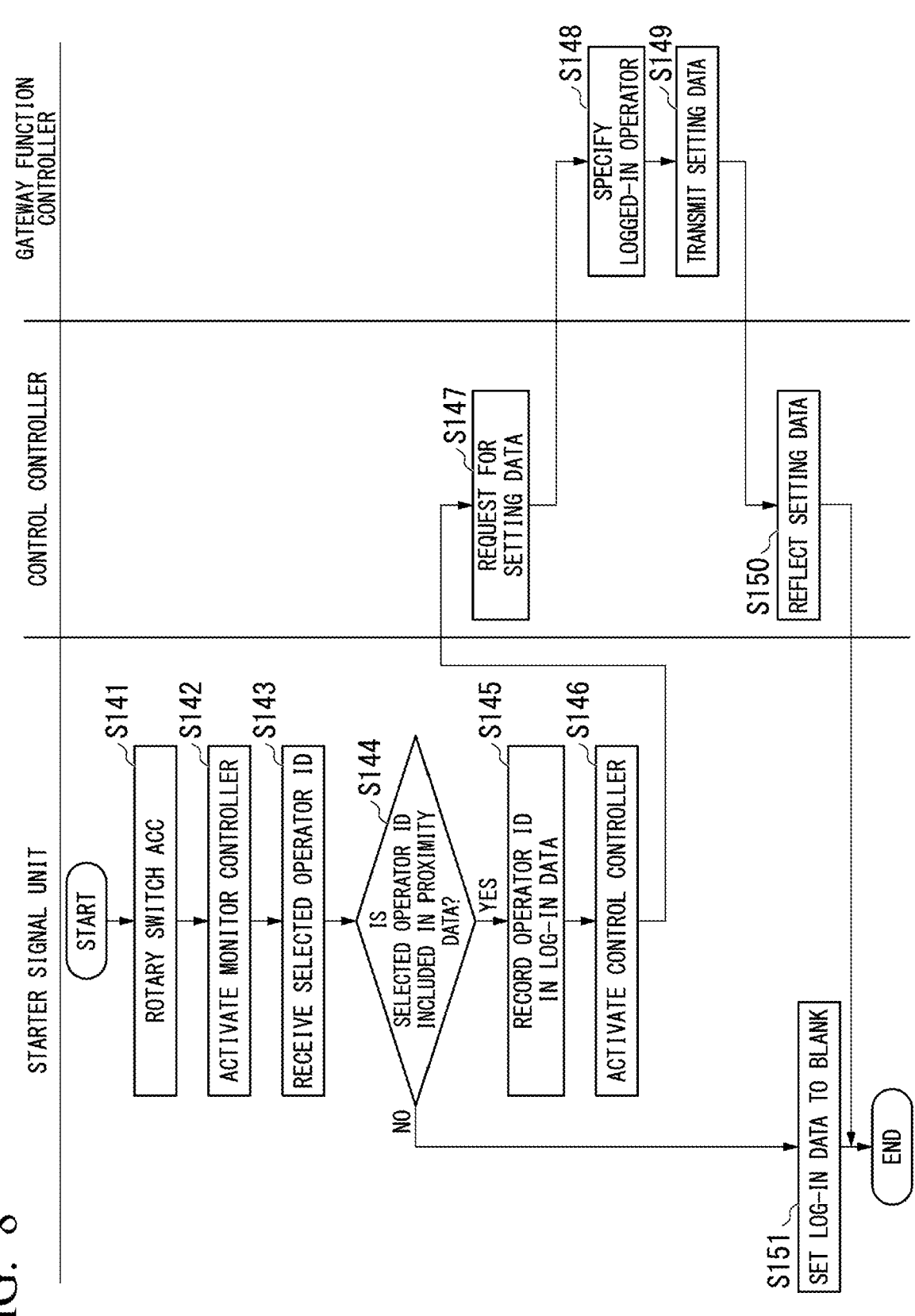
FIG. 8 is a flowchart showing an authentication operation of an operator that boards the work machine by the control system according to the first embodiment.

FIG. 8 is a flowchart showing an authentication operation of an operator that boards the work machine 100 by the control system 145 according to the first embodiment.

When the operator that boards the work machine 100 turns the rotary switch 144 to the ACC position, the signal input unit 223 of the starter signal unit 202 receives the input of a signal indicating ACC from the rotary switch 144 (step S141). Incidentally, since the rotary switch 144 is provided in the cab 140, the rotary switch 144 is operated after the lock of the door 141 is released, that is, after the proximity detection unit 225 detects that the specific operator is in close proximity to the work machine 100. When the signal indicating ACC is inputted, the activation unit 226 transmits an activation signal to the monitor controller 204 (step S142).

The monitor controller 204 outputs a signal to display a screen of a list of operators to receive the selection of the operator ID to the touch panel 145D. Incidentally, since the gateway function controller 203 is activated in advance by the processing shown in FIG. 6, the starter signal unit 202 can immediately communicate with other controllers as soon as the monitor controller 204 is activated. Therefore, even in a case where the monitor controller 204 acquires a signal to display the screen of the list of operators from another controller, the monitor controller 204 can acquire the signal immediately after the activation. A plurality of operator IDs are included on the screen of the list of operators. As a result, the touch panel 145D receives one selection from the plurality of operators.

When the operator selects one operator ID by operating the touch panel 145D, the control system 145 acquires the selected operator ID (step S143). The control system 145 determines whether or not the selected operator ID is included in the proximity data stored in the state storage unit 227 (step S144). When the selected operator ID is included in the proximity data (step S144: YES), the control system 145 records the operator ID in log-in data indicating a log-in state and stored in the state storage unit 227 (step S145). The log-in data is held to be referable via the in-vehicle network. The operator on board is authenticated as the specific operator. The activation unit 226 transmits an activation signal to the control controller 205 (step S146).

The control controller 205 is activated by the activation signal. When the control controller 205 is activated, the control controller 205 transmits a request for the setting data to the gateway function controller 203 (step S147). When the request for the setting data is received, the setting reflection unit 232 of the gateway function controller 203 reads the log-in data held by the starter signal unit 202 and specifies the operator ID of the logged-in operator (step S148). The setting reflection unit 232 reads the setting data associated with the operator ID specified in the step S148 from the setting data storage unit 231, and transmits the setting data to the control controller 205 (step S149). When the setting data is received, the control controller 205 reflects the received setting data in a control program and realizes vehicle body control that reflects the individual setting of the operator (step S150).

On the other hand, when the selected operator ID is not included in the proximity data (step S144: NO), the control system 145 determines that the authentication of the operator on board has failed, and rewrites the log-in data indicating the log-in state and stored in the state storage unit 227 to blank (step S151). That is, the control system 145 sets the state of the control system 145 as a log-out state. At this time, the activation unit 226 does not transmit an activation signal to the control controller 205. That is, although the gateway function controller 203 is activated and the lock of the door 141 is released due to the proximity of the specific operator, the control controller 205 to drive the work machine 100 by power is not activated unless the operator on board is authenticated as the specific operator. As a result, the control system 145 can prevent the work machine 100 from being operated by an outsider who does not have the operation right.

As described above, the control system 145 performs authentication by having one operator ID selected from the plurality of operator IDs. When the operator on board is the specific operator who possesses the operator terminal 300, the operator can find and press the operator's own operator ID from the screen of the list of operators. On the other hand, since an outsider who does not have the operation right does not know which operator ID indicates the specific operator present in the vicinity, the control system 145 can prevent an improper log-in.

At this time, the control system 145 may further enhance the security by further requesting a password or the like. In addition, in another embodiment, the operator may be authenticated using a biometrics authentication device, a face authentication device, or the like instead of the touch panel 145D. In addition, in another embodiment, the operator terminal 300 may be connected to the control system 145 and the control system 145 may perform the authentication of the operator by acquiring the operator ID from the operator terminal 300.

Incidentally, in another embodiment, the activation unit 226 may refer to the proximity data stored in the state storage unit 227 and activate the monitor controller 204 when it is confirmed that the specific operator is present in close proximity to the work machine 100.

In addition, in another embodiment, it may not be necessary to execute a portion of the processing of the flowchart shown in FIG. 8. For example, when the authentication of the operator is performed by a method that does not use the touch panel 145D in another embodiment, the starter signal unit 202 may not perform the processing of the step S142, the step S143, the step S145, and the step S151. In addition, in another embodiment, the starter signal unit 202 may not perform collation between the authenticated operator and the proximity data in the step S144. In addition, in another embodiment, the starter signal unit 202 may manage the setting data, so that the starter signal unit may execute the processing of the step S148 and the step S149. In this case, the starter signal unit 202 may transmit the setting data at the same time as transmitting the activation signal in step S146.

After that, when the rotary switch 144 is turned to the IG position, the activation unit 226 transmits an activation signal to the engine controller 206, and when the rotary switch 144 is turned to the ST position, the activation unit 226 drives the cell motor 1211 to drive the engine 121. However, although the engine 121 is driven, the work machine 100 cannot be driven by the power of the engine 121 unless the operator is authenticated and the control controller 205 is activated. In addition, when the cell motor 1211 has a starter cut relay, the activation unit 226 may set a starter cut output to be ON when the operator is authenticated, so that the engine 121 may not be driveable unless the operator is authenticated.

<<Effects>>

In this manner, according to the first embodiment, at the time of the activation of the work machine 100, the control system 145 first activates the monitor controller 204 to perform the authentication of the operator, and activates the control controller 205 when it is authenticated that the operator is the specific operator in the authentication processing using the monitor controller 204. As a result, the control system 145 performs the authentication of the operator by the monitor controller 204 before the control controller 205 is activated, and activates the control controller 205 after the authentication of the operator. That is, the control system 145 according to the first embodiment can perform the authentication of the operator without activating the control controller 205 that controls the vehicle body of the work machine 100.

In addition, the control system 145 according to the first embodiment activates the monitor controller 204 after it is detected that the specific operator is in close proximity to the work machine 100. As a result, it is possible to prevent the authentication function from being executed even though the specific operator does not board the work machine 100.

In addition, the control system 145 according to the first embodiment receives the selection of one operator from a plurality of operators including the specific operator and performs the authentication of the operator by determining whether or not the selected operator is the specific operator detected in close proximity to the work machine 100. Since it is difficult for an outsider who does not have the operation right to recognize the specific operator present in the vicinity, the control system 145 can prevent an improper log-in with a simple logic.

In addition, the control system 145 according to the first embodiment reads the setting data associated with the authenticated operator from the setting data storage unit 231 and reflects the setting data in the control controller 205. As a result, the control controller 205 can control the work machine 100 with a setting of the operators' preference immediately after the activation.

Another Embodiment

The embodiments have been described above in detail with reference to the drawings; however, the specific configurations are not limited to the above-described configurations, and various design changes or the like can be made. That is, in another embodiment, the order of the above-described processing may be appropriately changed. In addition, some of the processing may be executed in parallel.

The starter signal unit 202 according to the above-described embodiment may be configured by a single computer, or may be configured such that the configurations of the starter signal unit 202 are divided and disposed in a plurality of computers and the plurality of computers cooperate with each other to function as the starter signal unit 202. For example, in the starter signal unit 202, the function of outputting the activation signal and the function of performing the authentication of the operator may be implemented in separate computers. A portion of the computers configuring the starter signal unit 202 may be mounted inside the work machine 100 and other computers may be provided outside the work machine 100.

In the control system 145 according to the above-described embodiment, a portion of the configurations constituting the control system 145 may be mounted inside the work machine 100, and other configurations may be provided outside the work machine 100.

The operator terminal 300 according to the above-described embodiment is a terminal such as a smartphone that can execute an application program, but is not limited thereto. For example, the operator terminal 300 according to another embodiment may be a key fob having only a function of outputting a predetermined advertising packet. Incidentally, when the operator terminal 300 is a key fob, the selection of the work machine 100 to be activated cannot be received by the application program. In this case, among the work machines 100 that receive the advertising packet, all in which the operator ID included in the advertising packet is set as the specific operator may be activated.

<Computer Configuration>

Figure 9:
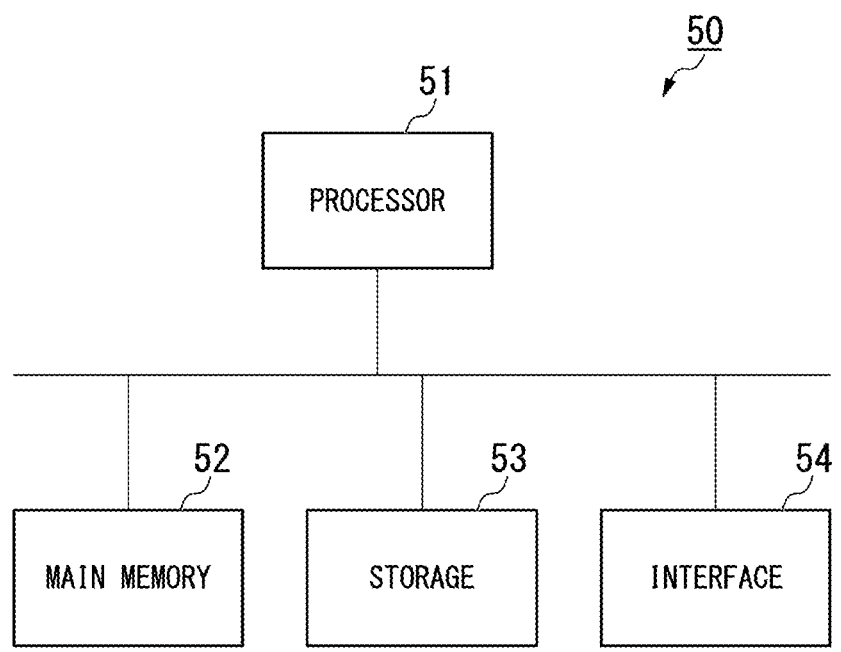
FIG. 9 is a schematic block diagram showing a configuration of a computer according to at least one embodiment.

FIG. 9 is a schematic block diagram showing the configuration of a computer according to at least one embodiment.

Each device (the starter signal unit 202, the gateway function controller 203, the monitor controller 204, the control controller 205, the engine controller 206, or the like) included in the control system 145 described above is implemented on a computer 50. The computer 50 includes a processor 51, a main memory 52, a storage 53, and an interface 54. The operation of each processing unit described above is stored in the storage 53 in the form of a program. The processor 51 reads the program from the storage 53, develops the program in the main memory 52, and executes the processing according to the program. In addition, the processor 51 secures a storage area corresponding to each of the storage units described above in the main memory 52 in accordance with the program. As an example of the processor 51, a central processing unit (CPU), a graphic processing unit (GPU), a microprocessor, or the like can be given.

The program may be for realization of some of the functions that the computer 50 is caused to exhibit. For example, the program may function in combination with another program already stored in the storage or in combination with another program implemented in another device. Incidentally, in another embodiment, the computer 50 may include a custom large scale integrated circuit (LSI) such as a programmable logic device (PLD), in addition to the above configuration or instead of the above configuration. Exemplary examples of the PLD include a programmable array logic (PAL), a generic array logic (GAL), a complex programmable logic device (CPLD), and a field programmable gate array (FPGA). In this case, some or all of the functions to be realized by the processor 51 may be realized by the integrated circuit. Such an integrated circuit is also included as an example of the processor.

Exemplary examples of the storage 53 include a magnetic disk, a magneto-optical disk, an optical disk, a semiconductor memory, and the like. The storage 53 may be an internal medium directly connected to the bus of the computer 50, or may be an external medium connected to the computer 50 through the interface 54 or a communication line. In addition, when this program is delivered to the computer 50 through a communication line, the computer 50 receiving the delivered program may develop the program in the main memory 52 and execute the above processing. In at least one embodiment, the storage 53 is a non-transitory tangible storage medium. In addition, the program may be for realizing some of the above-described functions. Further, the program may be a so-called differential file (differential program) that realizes the above-described function in combination with other programs already stored in the storage 53.

INDUSTRIAL APPLICABILITY

According to the above aspect, the activation system of the work machine can perform the authentication of the operator without activating the control unit that outputs a control signal to drive the vehicle body of the work machine with power supplied by the power source.

REFERENCE SIGNS LIST

100: Work machine
110: Undercarriage
120: Swing body
130: Work equipment
140: Cab
141: Door
1411: Lock actuator
1412: Door switch
144: Rotary switch
145: Control system
145D: Touch panel
201: Power supply unit
202: Starter signal unit
203: Gateway function controller
204: Monitor controller
205: Control controller
206: Engine controller
221: BLE communication unit
222: Network communication unit
223: Signal input unit
224: Operator storage unit
225: Proximity detection unit
226: Activation unit
227: State storage unit
231: Setting data storage unit
232: Setting reflection unit
300: Operator terminal

The invention claimed is:

1. An activation system of a work machine comprising:
a computer including a processor that executes a processing according to a program,
wherein the computer is configured to:
perform communication with a terminal owned by an operator of the work machine;

determine whether or not the operator is a specific operator who has an operation right for the work machine, based on an operator ID received from the terminal;

display an operator ID selection screen on a monitor or a touch panel provided inside the work machine, in a case in which it is determined that the operator is the specific operator;

receive input of the operator ID by the operator via the monitor or the touch panel;

try to authenticate whether or not the operator is the specific operator based on the input operator ID; and output a control signal to drive a vehicle body of the work machine with power supplied by a power source when it is authenticated that the operator is the specific operator.

2. The activation system of a work machine according to claim 1, wherein the computer is further configured to:

store setting data associated with a plurality of specific operators; and output the control signal based on the setting data associated with the authenticated specific operator.

3. The activation system of a work machine according to claim 1, wherein the computer is configured to:

store proximity data in a storage unit of the computer in a case in which it is determined that the operator is the specific operator based on the operator ID received from the terminal; and authenticate whether or not the operator is the specific operator based on the input operator ID and the proximity data.

4. The activation system of a work machine according to claim 1, wherein the computer is further configured to:

receive a selection of the operator ID by the operator via the monitor or the touch panel; and authenticate that the operator is the specific operator when the selected operator ID indicates the operator who owns the terminal.

5. The activation system of a work machine according to claim 4, wherein the computer is further configured to:

store setting data associated with a plurality of specific operators; and output the control signal based on the setting data associated with the authenticated specific operator.

6. An activation method of a work machine comprising:

a step of performing communication with a terminal owned by an operator of the work machine;

a step of determining whether or not the operator is a specific operator who has an operation right for the work machine, based on an operator ID received from the terminal;

a step of displaying an operator ID selection screen on a monitor or a touch panel provided inside the work machine, in a case in which it is determined that the operator is the specific operator;

a step of receiving input of the operator ID by the operator via the monitor or the touch panel;

a step of trying to authenticate whether or not the operator is the specific operator based on the input operator ID; and a step of outputting a control signal to drive a vehicle body of the work machine with power supplied by a power source, when it is authenticated that the operator is the specific operator.

7. The activation method of a work machine to claim 6, further comprising:

a step of receiving a selection of the operator ID by the operator via the monitor or the touch panel; and a step of authenticating that the operator is the specific operator when the selected operator ID indicates the operator who owns the terminal.

* * * * *